(12) United States Patent
Katou et al.

(10) Patent No.: US 8,878,471 B2
(45) Date of Patent: Nov. 4, 2014

(54) CONTROL APPARATUS FOR ELECTRIC ROTARY MACHINE

(75) Inventors: Hidenori Katou, Nagoya (JP); Makoto Taniguchi, Obu (JP)

(73) Assignee: Denso Corporation, Kariya (JP)

( * ) Notice: Subject to any disclaimer, the term of this patent is extended or adjusted under 35 U.S.C. 154(b) by 79 days.

(21) Appl. No.: 13/591,434

(22) Filed: Aug. 22, 2012

(65) Prior Publication Data
US 2013/0049653 A1 Feb. 28, 2013

(30) Foreign Application Priority Data

Aug. 31, 2011 (JP) .................................. 2011-189786
May 18, 2012 (JP) .................................. 2012-114288

(51) Int. Cl.
*H02P 21/00* (2006.01)
*H02P 6/00* (2006.01)
*G05B 11/01* (2006.01)
*H02P 23/00* (2006.01)
*H02P 21/05* (2006.01)

(52) U.S. Cl.
CPC ...................................... *H02P 21/05* (2013.01)
USPC ................. 318/400.02; 318/400.01; 318/629; 318/700; 318/798

(58) Field of Classification Search
USPC ................ 318/400.01, 400.02, 629, 700, 798
See application file for complete search history.

(56) References Cited

U.S. PATENT DOCUMENTS

| 7,034,493 B2* | 4/2006 | Yoshimoto et al. ........... 318/629 |
| 7,176,652 B2* | 2/2007 | Wakabayashi et al. .. 318/400.02 |
| 2002/0097015 A1 | 7/2002 | Kitajima et al. |
| 2004/0195993 A1 | 10/2004 | Yoshimoto et al. |
| 2006/0038531 A1* | 2/2006 | Wakabayashi et al. ....... 318/807 |
| 2010/0262307 A1* | 10/2010 | Imura ............................ 700/287 |
| 2012/0173066 A1* | 7/2012 | Yamada et al. ................. 701/22 |

FOREIGN PATENT DOCUMENTS

| JP | 2002-010686 | 1/2002 |
| JP | 2002-247899 | 8/2002 |
| JP | 2003-174794 | 6/2003 |
| JP | 2004-312864 | 11/2004 |
| JP | 2005-057935 | 3/2005 |
| JP | 2005-168212 | 6/2005 |
| JP | 3852289 | 9/2006 |

OTHER PUBLICATIONS

Office Action (2 pgs.) dated Aug. 20, 2013 issued in corresponding Japanese Application No. 2012-114288 with an at least partial English-language translation thereof (2 pgs.).

* cited by examiner

*Primary Examiner* — Eduardo Colon Santana
*Assistant Examiner* — Gabriel Agared
(74) *Attorney, Agent, or Firm* — Nixon & Vanderhye, P.C.

(57) ABSTRACT

In a control apparatus for an AC electric motor, a dq axis current feedback control unit 44 and a qn axis current feedback control unit 46 execute a feedback control of higher harmonic components of actual currents id and iq flowing in an AC electric machine 10 to higher harmonic current instruction values Σidkr and Σiqkr. A d axis current instruction value adjusting unit 24 and a q axis current instruction value adjusting unit 26 add the higher harmonic current instruction values Σidkr and Σiqkr to fundamental current instruction values idr and iqr. Ad axis current feedback control unit 32 and a q axis current feedback control unit 34 execute a feedback control of a difference between the actual currents id and iq and the sum of the higher harmonic current instruction values Σidkr, Σiqkr and the fundamental current instruction values idr and iqr into zero.

9 Claims, 11 Drawing Sheets

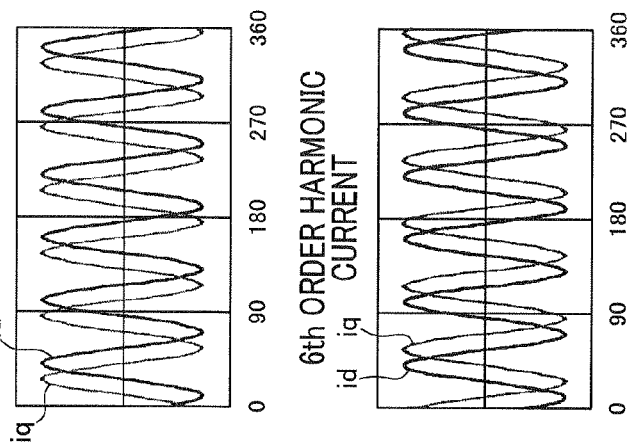
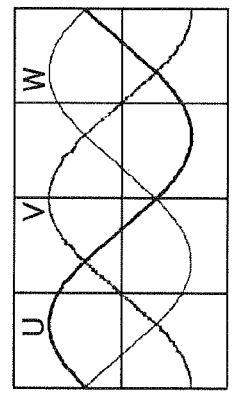
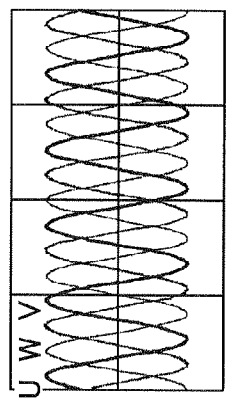
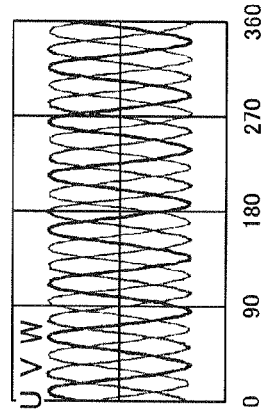
FIG.3A FUNDAMENTAL WAVE (POSITIVE PHASE SEQUENCE U→V→W)
FIG.3B n=5 (NEGATIVE PHASE SEQUENCE U→W→V)
FIG.3C n=7 (POSITIVE PHASE SEQUENCE U→V→W)

CONTROL APPARATUS FOR ELECTRIC ROTARY MACHINE

CROSS-REFERENCE TO RELATED APPLICATION

This application is related to and claims priority from Japanese Patent Applications No. 2011-189786 filed on Aug. 31, 2011 and No. 2012-114288 filed on May 18, 2012, the contents of which are hereby incorporated by reference.

BACKGROUND OF THE INVENTION

1. Field of the Invention

The present invention relates to control apparatus for executing a current feedback control of adjusting a current flowing in an electric rotary machine to an instruction current value, in particular, relates to a control apparatus for an electric rotary machine for controlling an AC voltage supply device capable of supplying an AC voltage to terminals of the electric rotary machine.

2. Description of the Related Art

There is a conventional known method of executing a current feedback control for executing a current feedback control of a current flowing in an electric rotary machine such as an electric motor and an alternating current (AC) synchronous machine. The current feedback control adjusts current components of a current of the AC synchronous machine flowing in a d-q coordinate system to current instruction values. Because such a known current feedback control method can adjust a direct current (DC) as a controlled variable, this allows a circuit designer to have an easy work of designing the current feedback control device in a control apparatus used for an electric rotary machine.

In order to have a DC current in a direct-Quadrature (dq) coordinate system when an electric motor has a constant torque, it is necessary to express an inductance, an interlinkage flux, etc. of the electric motor by using an exact sine function. In a case in which an inductance, etc. of an actual electric motor is expressed by a value which is shifted from an exact sine function (for example, which contains a higher harmonic wave), the electric motor has an increased torque ripple when components of a current in the d-q coordinate system are adjusted to corresponding instruction values.

In order to solve the above problem, there has been proposed a conventional technique, for example, Japanese patent No. 3852289, which adjusts components of a current in the dq coordinate system to values obtained by adding higher harmonic instruction values and DC instruction values. In more detail, the conventional technique executes:

the dq current feedback control which controls voltage instruction values in the dq coordinate system in order to adjust current components in the dq coordinate system of a current flowing in the electric motor; and the higher harmonic dq axis feedback control which executes a coordinate transformation of higher harmonic components of a current flowing in the electric motor to DC components, and operates dq axis instruction values in order to adjust the transformed DC components to higher harmonic instruction values.

However, because the conventional technique previously described executes the dq feedback control for adjusting components of the current which flows in an electric motor to DC current instruction values, the components of a fundamental current and the higher harmonic current components of the current which flows in the electric motor into instruction values of the fundamental wave (DC instruction values in the dq coordinate system). As a result, there is a possibility of being it difficult to obtain convergence to the current instruction values because the interference occurs between the dq axis current feedback control and the higher harmonic dq axis current feedback control.

SUMMARY

It is therefore desired to provide a control apparatus for an electric rotary machine capable of executing the feedback control of adjusting higher harmonic components of a current flowing in an electric rotary machine to current instruction values with high accuracy.

An exemplary embodiment provides a control apparatus for an electric rotary machine 10. The control apparatus has a fundamental rotary coordinate component calculation unit 27, a first control unit 32 and 34, a higher harmonic rotary coordinate component calculation unit 42, a second control unit 44, 46 and 50, an addition unit 52 and 54, and an alternating current voltage supply unit 60. For example, the first control unit is composed of a d-axis current feedback control unit 32 and a q-axis current feedback control unit 34, and the second control unit is composed of a dq axis current feedback control unit 44, a qn axis current feedback control unit 46 and a dqn/dq transformation unit 50. The addition unit is composed of a first d axis voltage instruction value addition unit 52 and a q axis voltage instruction value addition unit 54.

The fundamental rotary coordinate component calculation unit 27 calculates components in a fundamental rotary coordinate system. The fundamental rotary coordinate system rotates in synchronization with a frequency of a fundamental current in the current flowing in the electric rotary machine 10. In particular, an output torque of the electric rotary machine such as an electric motor 10 is determined by the fundamental current.

The first control unit 32 and 34 executes a feedback control of a current flowing in the electric rotary machine 10 so that the current flowing in the electric rotary machine 10 is adjusted to instruction values. The instruction values are obtained by adding higher harmonic instruction values as instruction values of higher harmonic current having a frequency of an integer multiple of a frequency of the fundamental current and fundamental instruction value of the fundamental current on the basis of the components of the rotary coordinate system of the fundamental wave calculated by the fundamental rotary coordinate component calculation unit 27.

The first control unit 32 and 34 outputs a first instruction voltage. The higher harmonic rotary coordinate component calculation unit 42 calculates components of the higher harmonic rotary coordinate system which rotates in synchronization with the frequency of the higher harmonic current. The second control unit 44, 46 and 50 executes a feedback control for the higher harmonic current by using the components of the higher harmonic coordinate system calculated by the higher harmonic rotary coordinate component calculation unit 42. The second control unit 44, 46 and 50 outputs a second instruction voltage. The addition unit 52 and 54 adds the first instruction voltage calculated by the first control unit 32 and 34 and the second instruction voltage calculated by the second control unit 44, 46 and 50. The addition unit 52 and 54 outputs an instruction voltage. The alternating current voltage supply unit 60 supplies an alternating current voltage to the electric rotary machine 10 on the basis of the instruction voltage calculated by the addition unit 52 and 54.

In general, a current flowing in the electric rotary machine such as an alternating current electric motor 10 contains higher harmonic components. These higher harmonic components of the current contain components which follow higher harmonic instruction values. Accordingly, a difference between the actual currents which currently flows in the electric rotary machine 10 and a sum of the higher harmonic instruction values and the fundamental instruction values becomes a value from which the higher harmonic components having the same order of the higher harmonic instruction values are decreased or removed. The control apparatus according to the exemplary embodiment of the present invention executes the feedback control of the current which flows in the electric rotary machine 10 on the basis of the above features.

BRIEF DESCRIPTION OF THE DRAWINGS

A preferred, non-limiting embodiment of the present invention will be described by way of example with reference to the accompanying drawings, in which:

FIG. 3A, FIG. 3B and FIG. 3C are timing charts which show higher harmonic instruction current values generated by the control apparatus according to the first exemplary embodiment of the present invention;

DETAILED DESCRIPTION OF THE PREFERRED EMBODIMENTS

Figure 1:
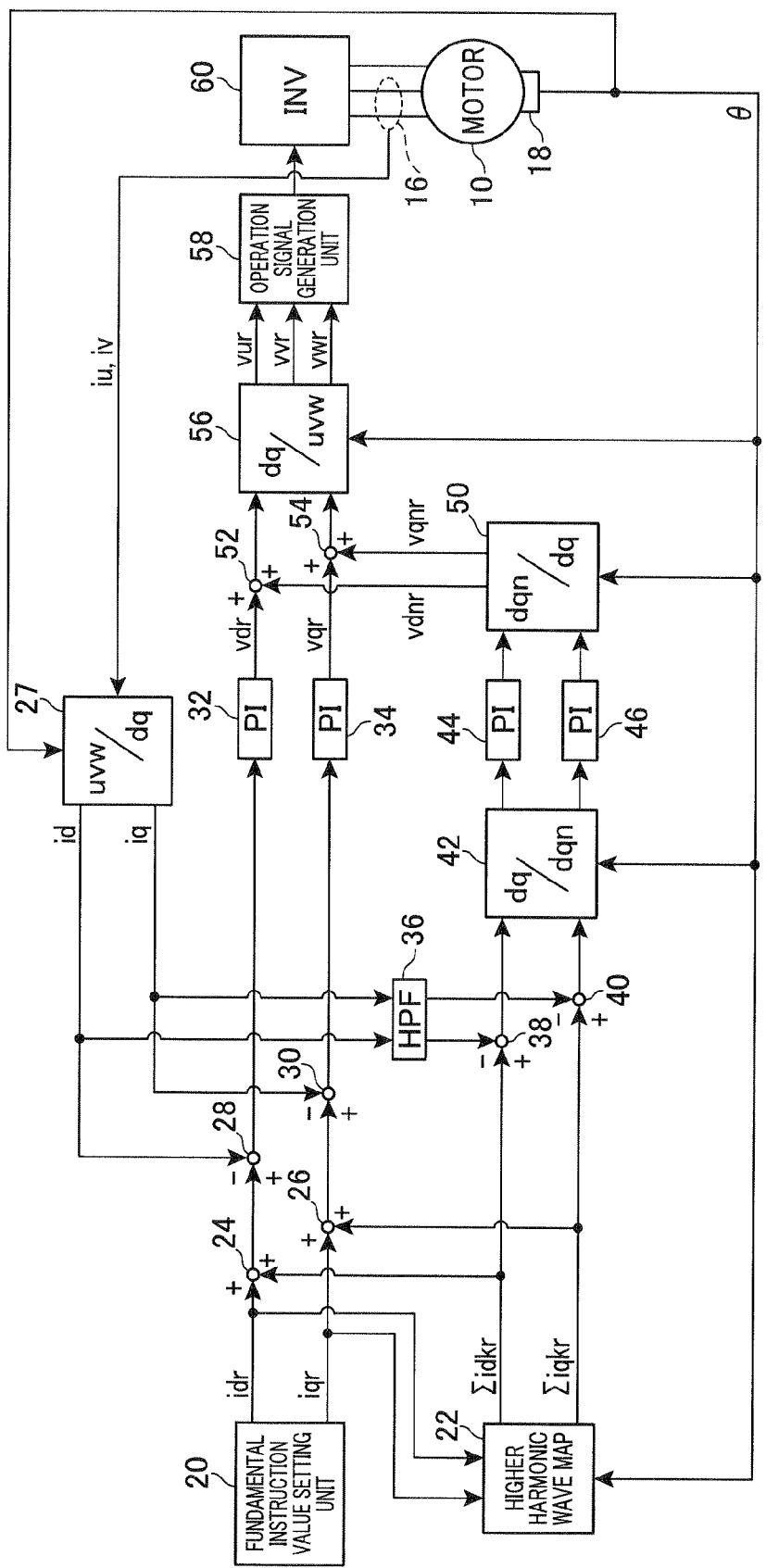
FIG. 1 is a view showing a system configuration of the control apparatus for an electric rotary machine according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.
First Exemplary Embodiment A description will be given of a control apparatus for an electric rotary machine according to a first exemplary embodiment of the present invention with reference to FIG. 1 to FIG. 3.

Figure 2:
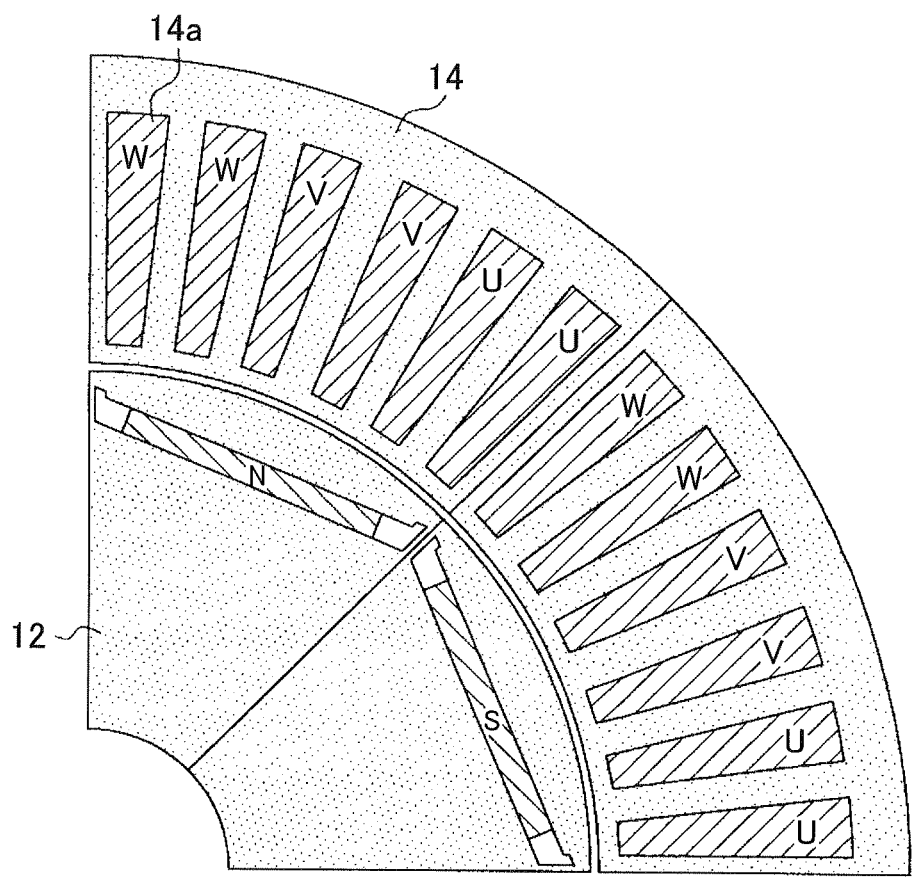
FIG. 2 is a view showing a part of the electric rotary machine as a control target of the control apparatus according to the first exemplary embodiment of the present invention.

FIG. 1 is a view showing a system configuration of the control apparatus for an electric rotary machine according to the first exemplary embodiment of the present invention. FIG. 2 is a view showing a part of the electric rotary machine as a control target of the control apparatus according to the first exemplary embodiment of the present invention.

An AC electric motor 10 shown in FIG. 1 is a three phase synchronous motor. A part of the AC electric motor 10 is shown in FIG. 2. In FIG. 2, reference character U designates a U phase stator winding stored in a corresponding slot, reference character V denotes a V phase stator winding stored in a corresponding slot, and reference character W indicates a W phase stator winding stored in a corresponding slot.

As shown in FIG. 1 and FIG. 2, the AC electric motor 10 has a rotor 12 and a stator 14. The rotor 12 has a pair of magnetic poles per 360°/4. The stator has twelve slots per 360°/4.

As shown in FIG. 1, a current sensor 16 detects an actual U phase current in and an actual V phase current in A rotation angle sensor 18 detects a rotation angle (electric angle θ).

A fundamental wave instruction setting unit 20 sets instruction values (such as fundamental current instruction values idr and iqr) of the fundamental wave in a dq coordinate system on the basis of a request torque, etc.

On the other hand, a higher harmonic wave map 22 inputs the electric angle θ of the AC electric motor 10 detected by the rotation angle sensor 18 and the fundamental current instruction values idr and iqr, and calculates higher harmonic instruction values (such as higher harmonic current instruction values Σidkr and Σiqkr)

The variable k used in the higher harmonic current instruction values Σidkr and Σiqkr indicates an order of a higher harmonic wave (or a higher harmonic order) in the dq coordinate system. The first exemplary embodiment uses the higher harmonic order k=6j (where j=1, 2, 3, . . . ).

These higher harmonic current instruction values Σidkr and Σiqkr are used for a current in order to reduce torque ripple which is generated when an actual current which currently flows in the AC electric motor 10 becomes the fundamental current instruction value idr or the fundamental current instruction value iqr.

A d axis current instruction adjusting unit 24 adds a higher harmonic current instruction value Σidkr to a fundamental current instruction value idr on the d axis. A q axis current instruction adjusting unit 26 adds a higher harmonic current instruction value Σiqkr to a fundamental current instruction value iqr on the q axis.

On the other hand, a uvw/dq transformation unit 27 transforms actual current components iu and iv to actual current components id and iq in the dq coordinate system, respectively on the basis of the electric angle θ of the AC electric motor 10 which is detected by the rotation angle sensor 18.

A d axis current difference calculation unit 28 calculates a difference between the actual current id and the output value of the d axis current instruction adjusting unit 24. A q axis current difference calculation unit 30 calculates a difference between the actual current iq and the output value of the q axis current instruction adjusting unit 26.

A d axis current feedback control unit 32 (as a first control unit) calculates a first d axis instruction voltage vdr in order to control the output value of the d axis current difference calculation unit 28 to zero by the feedback control.

A q axis current feedback control unit 34 (as a first control unit) calculates a first q axis instruction voltage vqr in order to control the output value of the q axis current difference calculation unit 30 to zero by the feedback control.

The first exemplary embodiment uses both the d axis current feedback control unit 32 and the q axis current feedback control unit 34 as a unit for adding a proportional component and an integral component and outputting a result of the addition.

On the other hand, a high-pass filter (HPF as a higher harmonic component extracting unit) 36 extracts higher harmonic components from the actual currents id and iq on the basis of changes of each of sampled values of the actual currents id and iq.

A d axis higher harmonic current deviation calculation unit 38 calculates a difference between the higher harmonic component extracted from the actual current id by the high-pass filter 36 and the higher harmonic current instruction value Σidkr. A q axis higher harmonic current deviation calculation unit 40 calculates a difference between the higher harmonic component extracted from the actual current iq by the high-pass filter 36 and the higher harmonic current instruction value Σiqkr.

A dq/dqn transformation unit 42 (as a higher harmonic rotary coordinate component calculation unit) transforms the output values of the d axis higher harmonic current deviation calculation unit 38 and the q axis higher harmonic current deviation calculation unit 40 into values in the dq coordinate system which rotates at a speed which is n times of the electric angular velocity.

The dq/dqn transformation unit 42 executes the transformation process on the basis of the higher harmonic current instruction values Σidkr and Σiqkr stored in a higher harmonic wave map 22.

FIG. 3A, FIG. 3B and FIG. 3C are timing charts which show the higher harmonic instruction current values generated by the control apparatus according to the first exemplary embodiment of the present invention. FIG. 3A, FIG. 3B and FIG. 3C show a case of higher harmonic currents having a six order in the dq coordinate system which are generated on the basis of either the (6j−1) order higher harmonic current or the (6j+1) order higher harmonic current.

FIG. 3A, FIG. 3B and FIG. 3C shows the cases in which the higher harmonic currents of the U phase, V phase and W phase have the same phase difference relative to each other, and the fifth order current in the dq coordinate system becomes the six order higher harmonic current in the dq coordinate system when a peak is coming in the U phase, W phase and V phase in order, and the seventh order current in the dq coordinate system becomes the six order higher harmonic current in the dq coordinate system when a peak is coming in the U phase, V phase and W phase in order.

That is, there are two types of the dq/dqn transformation processes selected from whether or not the dq/dqn transformation unit 42 uses the higher harmonic current instruction values Σidkr and Σiqkr which order higher harmonic current is generated during the transformation process. It is accordingly necessary to execute the dq/dqn transformation process on the basis of mapping the higher harmonic current instruction values Σidkr and Σiqkr with those orders.

That is, when the rotation direction from the U phase to the V phase by an acute angle between the U phase and the V phase is a positive direction and when a higher harmonic current of (6j−1) order in the uvw coordinate system is generated, the dq/dqn transformation can be expressed by the following equation (c1).

$$\begin{pmatrix} \cos(-n\theta) & \sin(-n\theta) \\ -\sin(-n\theta) & \cos(-n\theta) \end{pmatrix} = \begin{pmatrix} \cos n\theta & -\sin n\theta \\ \sin n\theta & \cos n\theta \end{pmatrix}. \tag{c1}$$

On the other hand, when the rotation direction from the U phase to the V phase by an acute angle between the U phase and the V phase is a positive direction and when a higher harmonic current of (6j+1) order in the uvw coordinate system is generated, the dq/dqn transformation can be expressed by the following equation (c2).

$$\begin{pmatrix} \cos n\theta & \sin n\theta \\ -\sin n\theta & \cos n\theta \end{pmatrix}. \tag{c2}$$

A dn axis current feedback control unit 44 (as a second control unit) shown in FIG. 1 calculates an operation value in order to execute the feedback control of adjusting the dn axis component in the output value of the dq/dqn transformation unit 42 to zero. A qn axis current feedback control unit 46 (as a second control unit) calculates an operation value in order to execute the feedback control of adjusting the qn axis component in the output value of the dq/dqn transformation unit 42 to zero.

The first exemplary embodiment uses both the dn axis current feedback control unit 44 and the qn axis current feedback control unit 46 as a unit for adding a proportional component and an integral component and outputting a result of the addition.

A dqn/dq transformation unit 50 (as a second control unit) executes an inverse transformation of the output value of the do axis current feedback control unit 44 and the qn axis current feedback control unit 46 on the basis of the electric angle θ of the AC electric motor 10 detected by the rotation angle sensor 18. That is, the dqn/dq transformation unit 50 executes the inverse transformation of the dq/dqn transformation unit 42. The dqn/dq transformation unit 50 calculates a second d axis voltage instruction value vdnr and a second q axis voltage instruction value vqnr.

A d axis voltage instruction value addition unit 52 (as an addition unit) adds the second d axis voltage instruction value vdnr to the first d axis voltage instruction value vdr. A q axis voltage instruction value addition unit 54 (as an addition unit) adds the second q axis voltage instruction value vqnr to the first q axis voltage instruction value vqr.

A dq/uvw transformation unit 56 calculates voltage instruction values uvr, vvr and vwr of the u phase, v phase and w phase on the basis of the electric angle θ of the AC electric motor 10 detected by the rotation angle sensor 18 by executing the inverse transformation of the uvw/dq transformation unit 27.

An operation signal generation unit 58 generates operation signals to be supplied to the inverter (INV) 60 (as an AC voltage supply unit) so that the output voltages of the inverter 60 become the instruction voltages vur, vvr and vwr in the u phase, v phase and w phase, respectively. For example, the operation signal generation unit 58 generates those operation signals by a triangle wave comparison PWM process.

These operation signals supplied from the operation signal generation unit 58 control switching components of the inverter INV 60 in order to selectively connect a positive electrode and a negative electrode of a DC power source to each terminals of the AC electric motor 10. This allows the inverter 60 to supply AC voltage to the AC electric motor 10.

The first exemplary embodiment uses the second d axis voltage instruction value vdnr and the second q axis voltage instruction value vqnr as the operation values in order to control the higher harmonic current values output from the high-pass filter 36 to the higher harmonic current instruction values Σidkr and Σiqkr during the feedback control. The first exemplary embodiment further uses the first d axis voltage instruction value vdr and the first q axis voltage instruction value vqr as the operation values in order to control the fundamental components of the higher harmonic current values to the fundamental current instruction values idr and iqr during the feedback control. This means that the d axis current difference calculation unit 28 and the q axis current difference calculation unit 30 calculate outputs having a higher harmonic component which is adequately reduced from the actual currents id and iq, respectively. That is, each of the d axis current difference calculation unit 28 and the q axis current difference calculation unit 30 subtracts the higher harmonic current instruction values Σidkr and Σiqkr from the actual currents id and iq, respectively. Further, the dn axis current feedback control unit 44 and the qn axis current feedback control unit 46 controls the higher harmonic components in the actual currents id and iq to the higher harmonic current instruction values Σidkr and Σiqkr during the feedback operation.

This allows the d axis current feedback control unit 32 and the q axis current feedback control unit 34 to control the fundamental components of the actual current components id and iq to the fundamental current instruction values idr and iqr, respectively.

It is possible to use n-th order higher harmonic waves as DC components because the dn axis current feedback control unit 44 and the qn axis current feedback control unit 46 control the output value of the dq/dqn transformation unit 42 to zero in the feedback process. This can increase the ability to control or effectiveness of controlling the n-th order higher harmonic components. In the first exemplary embodiment the order number "n" corresponds to the number of slots per electric angle period of the AC electric motor 10. In a concrete example, when the AC electric motor 10 has the structure shown in FIG. 2, the order number "n" is 12 (n=12). This means that the number of the slots and the permeance are periodically changed during electric angle period of the revolution of the AC electric motor 10 on the basis of a difference in permeance between a stator core (teeth) and a slot. The stator winding is wound around the stator core.

Because torque ripple of the AC electric motor 10 is generated on the basis of higher harmonic waves generated by the above periodical change of the number of the slots and the permeance, the first exemplary embodiment executes the feedback control by using the components in the dqn coordinate system in order to adequately reduce the influence of the higher harmonic waves.

The control apparatus according to the first exemplary embodiment uses the higher harmonic current instruction values Σidkr and Σiqkr containing a plurality of instruction currents having an order of a six multiple because the higher harmonic waves having an order of a six multiple affect the torque ripple in the AC electric motor 10.

A description will now be given of the effects of the control apparatus according to the first exemplary embodiment of the present invention.

(1) The d axis current feedback control unit 32 and the q-axis current feedback control unit 34 receive the difference values between the actual current components id and iq and the values obtained by adding the fundamental current instruction values idr and iqr and the highly harmonic current instruction values Σidkr and Σiqkr, respectively. The first control unit used in the claims is composed of the d-axis current feedback control unit 32 and the q-axis current feedback control unit 34.

That is, the d axis current feedback control unit 32 receives a difference value between the actual current value idr and the value obtained by adding the fundamental current instruction value idr to the highly harmonic current instruction value Σidkr. On the other hand, the q axis current feedback control unit 34 receives the difference value between the actual current value iqr and the value obtained by adding the fundamental current instruction value iqr to the highly harmonic current instruction value Σiqkr. This makes it possible to avoid interference to control the higher harmonic current instruction value Σidkr and the higher harmonic current instruction value Σiqkr, and to execute a correct control to the fundamental current instruction values idr and iqr.

(2) The second control unit receives components in the dqn coordinate system. The dn axis current feedback control unit 44, the qn axis current feedback control unit 46 and the dqn/dq transformation unit 50 correspond to the second control unit used in the claims. The second control unit controls the components in the dqn coordinate system as the input values to the higher harmonic current instruction values Σidkr and Σiqkr during the feedback control. This makes it possible to control the higher harmonic of the n-th order to the DC components, and thereby to increase the controllability of the higher harmonic wave of the n-th order.

(3) The second control unit composed of the dn axis current feedback control unit 44 and the qn axis current feedback control unit 46 inputs the output values of the high-pass filter 36 (as the higher harmonic component extracting unit 36), and uses the input values as the control values. This makes it possible to easily and correctly determine the control values to be supplied to the dn axis current feedback control unit 44 and the qn axis current feedback control unit 46.

(4) In the first exemplary embodiment, the order "n" of the higher harmonic components to be transformed to the DC components is set to an order which is equal to the number of the slots per electric angle period. This makes it possible to transform, to the DC components, the components in higher harmonic wavers having a large influence to generate the torque ripple. This makes it possible to increase the controllability of these components in the higher harmonic waves.

Second Exemplary Embodiment

A description will be given of the control apparatus according to the second exemplary embodiment of the present invention with reference to FIG. 4, FIG. 5A, FIG. 5B and FIG. 5C.

Figure 4:
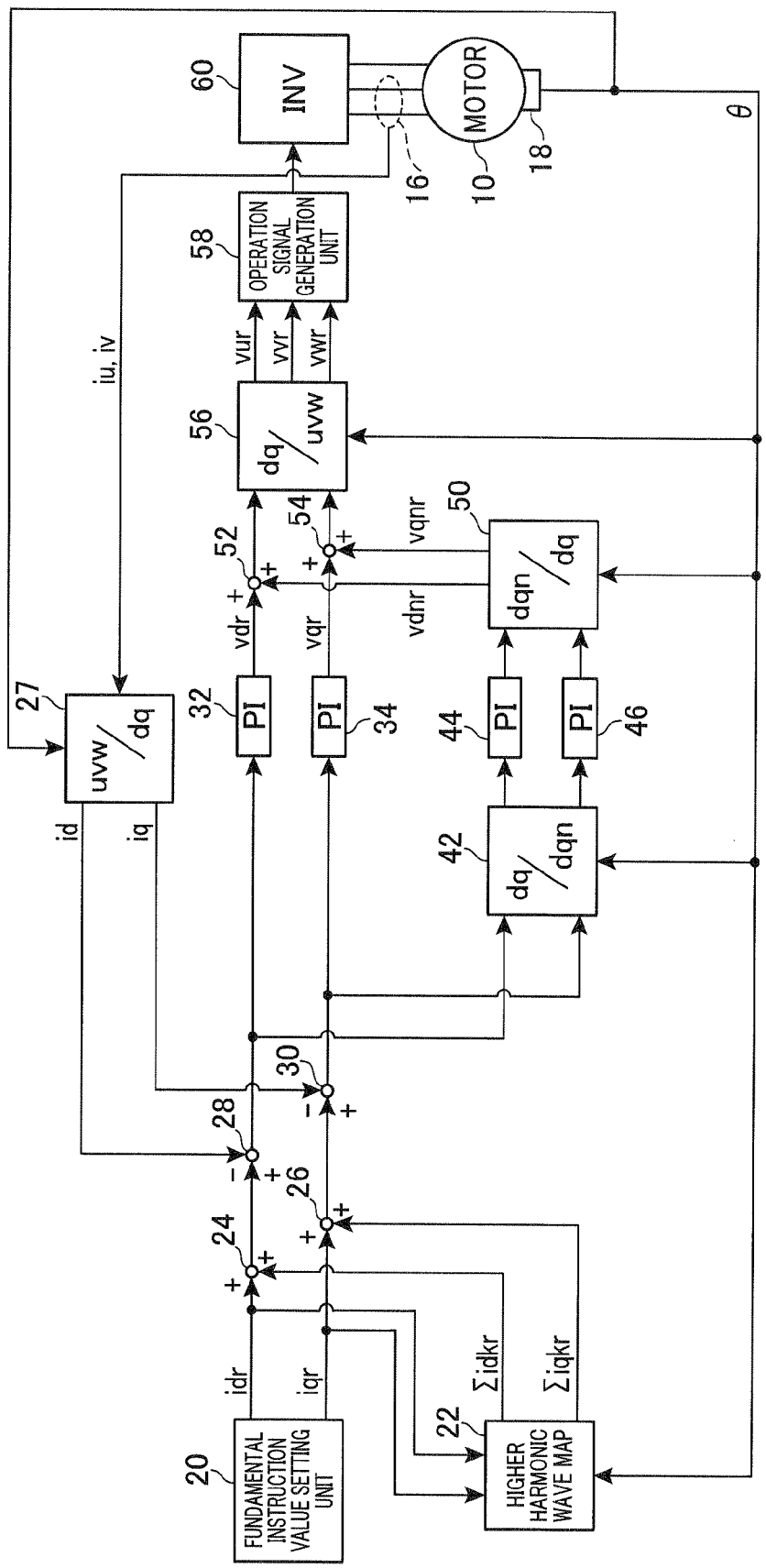
FIG. 4 is a view showing a system configuration of the control apparatus for an electric rotary machine according to a second exemplary embodiment of the present invention.
Figure 5:
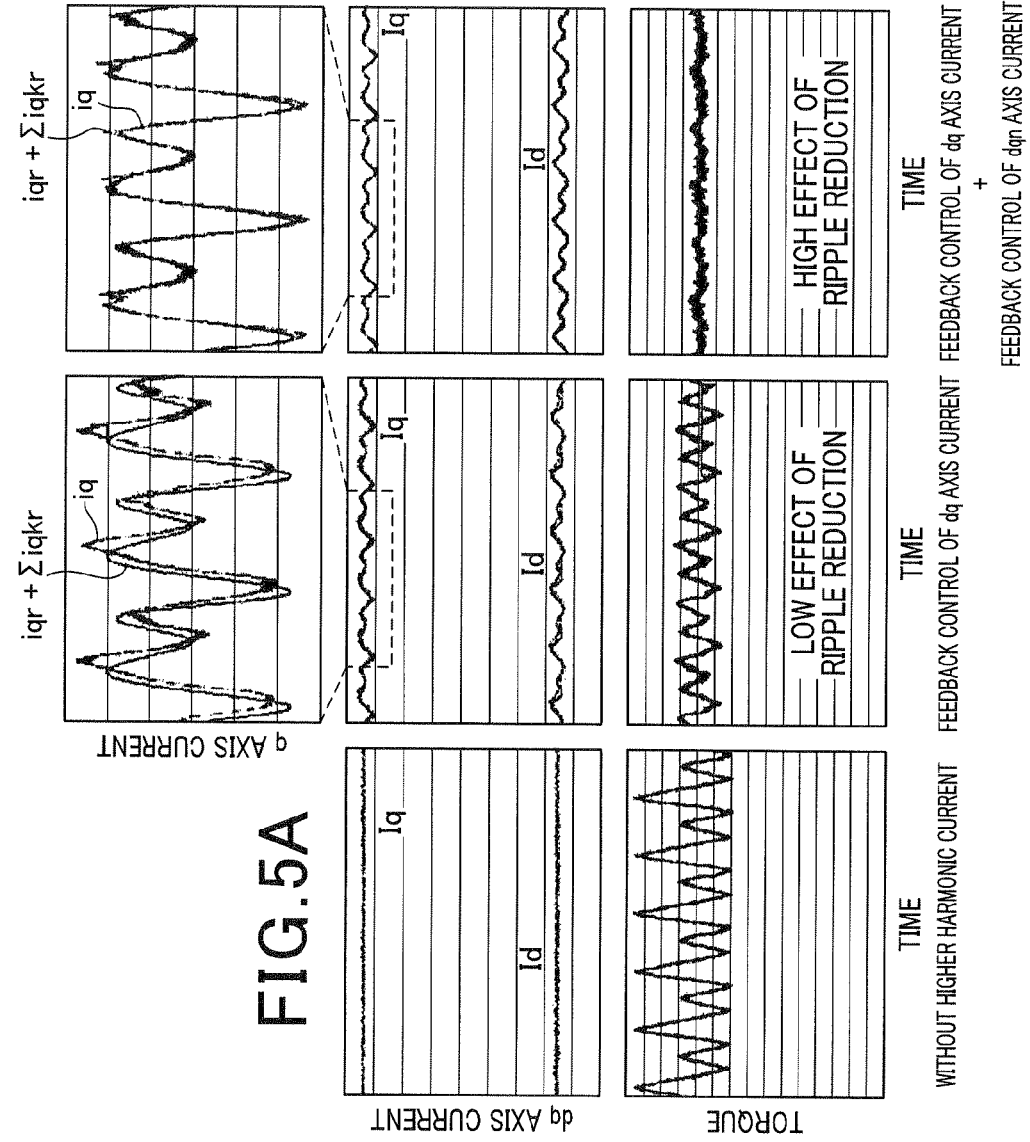
FIG. 5A, FIG. 5B and FIG. 5C are timing charts which show resultant effects of the control apparatus according to the second exemplary embodiment of the present invention.

FIG. 4 is a view showing a system configuration of the control apparatus for the electric rotary machine 10 according to the second exemplary embodiment of the present invention.

The same components of the control apparatus according to the first exemplary embodiment will be referred with the same reference numbers, and the explanation thereof is omitted.

As shown in FIG. 4, the control apparatus according to the second exemplary embodiment does not have the high-pass filter 36 which is used in the control apparatus according to the first exemplary embodiment. In the structure of the control apparatus according to the second exemplary embodiment, the do axis current feedback control unit 44 inputs as the control value the output of the d axis current difference calculation unit 28 through the dq/dqn transformation unit 42. Similarly, the qn axis current feedback control unit 46 inputs as the control value the output of the q axis current difference calculation unit 30 through the dq/dqn transformation unit 42. This means that the fundamental components are adequately extracted from the output values of the d axis current difference calculation unit 28 and the q axis current difference calculation unit 30 because the d axis current feedback control unit 32 and the q axis current feedback control unit 34 control the fundamental components of the actual current values id and iq to the fundamental current instruction values idr and iqr.

This structure of the control apparatus according to the second exemplary embodiment makes it possible to maintain the responsive function even if the rotation speed of the AC electric motor 10 is changed. That is, there is a possibility of deterioration of the responsive function in the structure of the control apparatus according to the first exemplary embodiment because the high-pass filter 36 also outputs a transition component in the fundamental component during a transition state in which the rotation speed of the AC electric motor 10 is changed.

On the other hand, in the structure of the control apparatus according to the second exemplary embodiment, the d axis current feedback control unit 32 and the q axis current feedback control unit 34 quickly and adequately eliminate the fundamental components in the output values of the d axis current difference calculation unit 28 and the q axis current difference calculation unit 30 even if during the transition state. This makes it possible to avoid including the fundamental components into the input parameters of the do axis current feedback control unit 44 and the qn axis current feedback control unit 46.

In addition, it is requested for the high-pass filter 36 to have various cut-off frequencies when the rotation speed of the AC electric motor 10 is varied in the structure of the control apparatus according to the first exemplary embodiment. This increases a complication in control.

A description will now be given of the effects of the control apparatus according to the second exemplary embodiment with reference to FIG. 5A, FIG. 5B and FIG. 5C.

FIG. 5A, FIG. 5B and FIG. 5C are timing charts which show resultant effect of the control apparatus according to the second exemplary embodiment of the present invention.

As shown in FIG. 5A, a large torque ripple is generated in the AC electric motor 10 by the fundamental current instruction values idr and iqr supplied by the fundamental wave instruction setting unit 20. In order to avoid torque ripple in the electric motor 10 from being generated and increased, the control apparatus according to the second exemplary embodiment adjusts the higher harmonic current instruction value Σidkr and Σiqkr in order to decrease the generation of the torque ripple as shown in FIG. 5C.

On the other hand, FIG. 5B shows the case in which the control apparatus does not have the dn axis current feedback control unit 44 and the qn axis current feedback control unit 46, and the d axis current feedback control unit 32 and the q axis current feedback control unit 34 control the actual currents idr and iqr to the values obtained by adding the fundamental current instruction values idr and iqr to the higher harmonic current instruction values Σidkr and Σiqkr, respectively. This deteriorates the followability to the current instruction values and as a result, it is difficult to adequately decrease the generation of torque ripple.

The upper side in each of FIG. 5B and FIG. 5C shows the expanded waveform of dq axis current.

Accordingly, the control apparatus having the dn axis current feedback control unit 44 and the qn axis current feedback control unit 46 according to the first and second exemplary embodiments can increase the followability to the instruction current values when compared with the control apparatus without the dn axis current feedback control unit 44 and the qn axis current feedback control unit 46.

Third Exemplary Embodiment

A description will be given of the control apparatus according to the third exemplary embodiment of the present invention with reference to FIG. 6.

Figure 6:
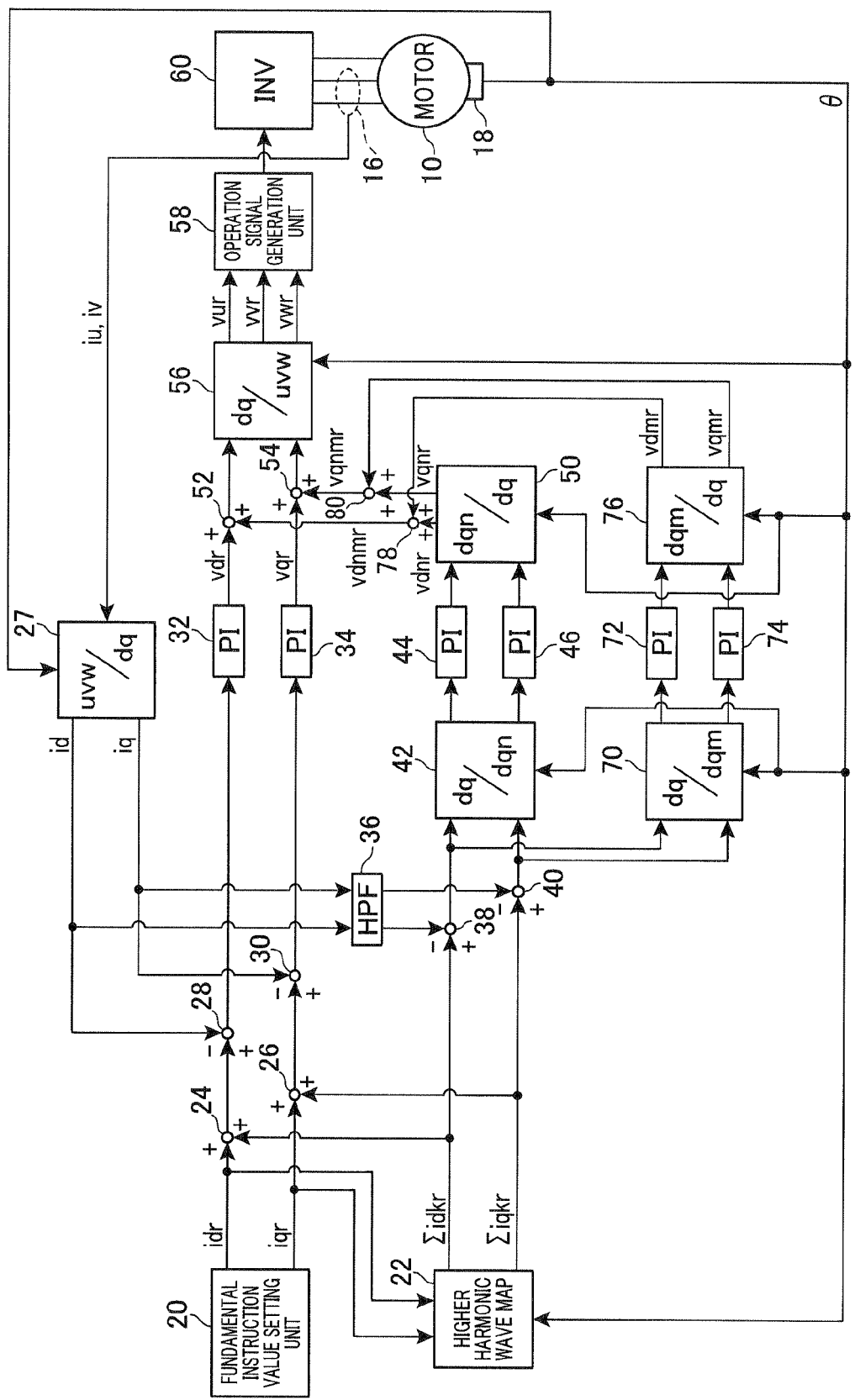
FIG. 6 is a view showing a system configuration of the control apparatus for an electric rotary machine according to a third exemplary embodiment of the present invention.

FIG. 6 is a view showing a system configuration of the control apparatus for an electric rotary machine according to the third exemplary embodiment of the present invention.

The same components of the control apparatus according to the first exemplary embodiment will be referred with the same reference numbers, and the explanation thereof is omitted.

As shown in FIG. 6, the control apparatus according to the third exemplary embodiment has a dq/dqm transformation unit 70 in addition to the dq/dqn transformation unit 42. The dq/dqm transformation unit 70 transforms higher harmonic components of m-th order to DC components.

The dq/dqm transformation unit 70 transforms the output values of the d axis higher harmonic current deviation calculation unit 38 and the q axis higher harmonic current deviation calculation unit 40 into the components in the dqm coordinate system on the basis of the electric angle $\theta$ of the AC electric motor 10 detected by the rotation angle sensor 18.

The dm axis current feedback control unit 72 calculates, as an operation value, a third d axis voltage instruction value vdmr in order to control the dm axis component output from the dq/dqm transformation unit 70 into zero during the feedback control. A qm axis current feedback control unit 74 calculates as an operation value a third q-axis voltage instruction value vqmr in order to control the qm axis component output from the dq/dqm transformation unit 70 into zero during the feedback control.

A dqm/dq transformation unit 76 executes an inverse transformation of the output value of the dm axis current feedback control unit 72 and the output value of the qm axis current feedback control unit 74 on the basis of the electric angle $\theta$ of the AC electric motor 10 detected by the rotation angle sensor 18. That is, the dqm/dq transformation unit 76 executes the inverse transformation of the dq/dqm transformation unit 70.

A second d axis voltage instruction addition unit 78 adds the d axis component in the output (as the second d axis voltage instruction value vdnr) of the dqn/dq transformation unit 50 and the d axis component in the output (as the third d axis voltage instruction value vdmr) of the dqm/dq transformation unit 76, and outputs the addition result as a fourth d axis voltage instruction value vdnmr.

A second q axis voltage instruction addition unit 80 adds the q axis component in the output (as the second q-axis voltage instruction value vdnr) of the dqn/dq transformation unit 50 and the q axis component in the output (as the third d axis voltage instruction value vqmr) of the dqm/dq transformation unit 76, and outputs the addition result as a fourth q axis voltage instruction value vqnmr.

The d axis voltage instruction value addition unit 52 as a first d axis voltage instruction value addition unit 52 adds the first d axis voltage instruction value vdr and the fourth d axis voltage instruction value vdnmr. The q axis voltage instruction value addition unit 54 as a first q axis voltage instruction value addition unit 54 adds the first q axis voltage instruction value vqr and the fourth q axis voltage instruction value vqnmr.

The structure of the control apparatus according to the third exemplary embodiment shown in FIG. 6 can control the higher harmonic waves as m-th order (m≠n) to DC components. This makes it possible to increase the controllability of the current flowing in the AC electric motor 10.

Fourth Exemplary Embodiment

A description will be given of the control apparatus according to the fourth exemplary embodiment with reference to FIG. 7. The following description will show a difference in structure and effects between the fourth exemplary embodiment shown in FIG. 7 and the third exemplary embodiment shown in FIG. 6.

Figure 7:
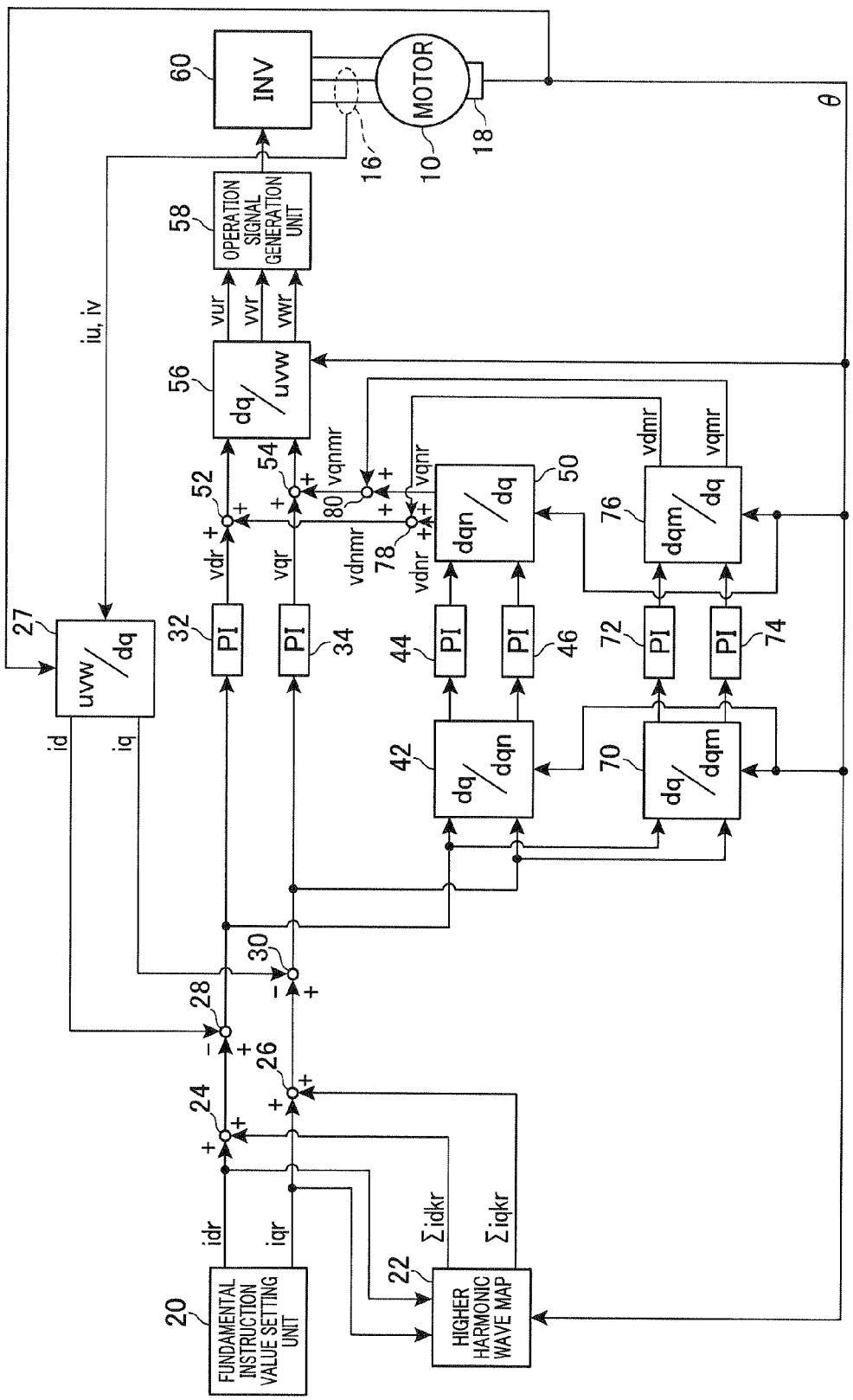
FIG. 7 is a view showing a system configuration of the control apparatus for an electric rotary machine according to a fourth exemplary embodiment of the present invention.

FIG. 7 is a view showing a system configuration of the control apparatus for an electric rotary machine according to the fourth exemplary embodiment of the present invention.

The same components of the control apparatus according to the third exemplary embodiment shown in FIG. 6 will be referred with the same reference numbers, and the explanation thereof is omitted.

As shown in FIG. 7, the control apparatus according to the fourth embodiment does not have the high-pass filter 36. Further, the dn axis current feedback control unit 44 and the qn axis current feedback control unit 46 receive as control values the outputs of the d-axis current difference calculation unit 28 and the q axis current difference calculation unit 30, respectively. Similarly, the dm axis current feedback control unit 72 and the qm axis current feedback control unit 74 receive as control values the outputs of the d axis current difference calculation unit 28 and the q axis current difference calculation unit 30, respectively.

That is, the control apparatus according to the fourth embodiment executes the feedback control which uses as input parameters the output values of the d axis current difference calculation unit 28 and the q axis current difference calculation unit 30 through the dq/dqn transformation unit 42 and the dq/dqm transformation unit 70, respectively. The dq/dqn transformation unit 42 executes the dqn transformation of the output value of the d axis current difference calculation unit 28. The dq/dqm transformation unit 70 executes the dqm transformation of the output value of the q axis current difference calculation unit 30. This structure shown in FIG. 7 makes it possible to eliminate fundamental components from the input parameters as the control values to be supplied to the do axis current feedback control unit 44, the qn axis current feedback control unit 46, the dm axis current feedback control unit 72 and the qm axis current feedback control unit 74. Still further, the control apparatus according to the fourth exemplary embodiment has a simple structure because of not having any high-pass filter. In other words, the fourth embodiment provides the control apparatus with a simple configuration capable of decreasing a torque ripple phenomenon.

(Various Modifications)

The concept of the present invention is not limited by the structures and functions of the control devices according to the first to fourth embodiments previously described and shown in FIG. 1 to FIG. 7.

(First Control Unit)

The concept of the present invention is not limited by the structure of the first control unit which calculates the control values of the feedback control on the basis of the sum of the output of the proportional element and the output of the integration element. The proportional element receives a difference between the actual current values id and iq and the sum of the fundamental current instruction values idr and iqr and the higher harmonic current instruction values Σidkr and Σiqkr, respectively. Similarly, the integration element receives the difference between the actual current values id and iq and the sum of the fundamental current instruction values idr and iqr and the higher harmonic current instruction values Σidkr and Σiqkr, respectively. For example, it is possible to calculate and use as the control values the sum of the output of the proportional element, the output of the integration element, and the output of the derivative element.

(Second Control Unit)

The concept of the present invention is not limited by the structure of the second control unit which calculates which calculates the control values of the feedback control on the basis of the sum of the output of the proportional element and the output of the integration element. The proportional element receives a difference between the higher harmonic currents and the higher harmonic current instruction values Σidkr and Σiqkr. Similarly, the integration element receives a difference between the higher harmonic currents and the higher harmonic current instruction values Σidkr and Σiqkr. For example, it is possible to calculate and use as the control values the sum of the output of the proportional element, the output of the integration element, and the output of the derivative element.

The concept of the present invention is not limited by the structure of the second control unit which changes the higher harmonic current instruction values Σidkr and Σiqkr every electric angle θ. For example, it is possible to use instruction values which correspond to values calculated by the dqn transformation of the output of the high-pass filter 36. These instruction values are free from any electric angle θ.

It is possible for the second control unit to input DC components which are transformed from the higher harmonic current instruction values Σidkr and Σiqkr. For example, it is possible that the d axis higher harmonic current deviation calculation unit 38 and the q axis higher harmonic current deviation calculation unit 40, which are previously described in the first exemplary embodiment, receive the n-th order higher harmonic current instruction values idnr and iqnr, only.

(Higher Harmonic Component Extracting Unit)

The concept of the present invention is not limited by the high-pass filter 36 (as higher harmonic component extracting unit) which extracts the higher harmonic components from the input values on the basis of the change of the current flowing in the AC electric motor 10. For example, it is possible to use a band filter instead of the high-pass filter 36. It is also possible to use, instead of the high-pass filter 36, a unit which outputs a difference between the actual currents id and iq and values obtained by a low-pass filter process.

(Higher Harmonic Instruction Values)

The concept of the present invention is not limited by the structure which receives the fundamental current instruction values idr and idq. For example, it is possible to use a unit which receives an input parameter (such as a request torque) in order to set the fundamental instruction values.

It is possible to use higher harmonic waves only which is transformed to a DC component.

(Fundamental Rotary Coordinate System)

Figure 8:
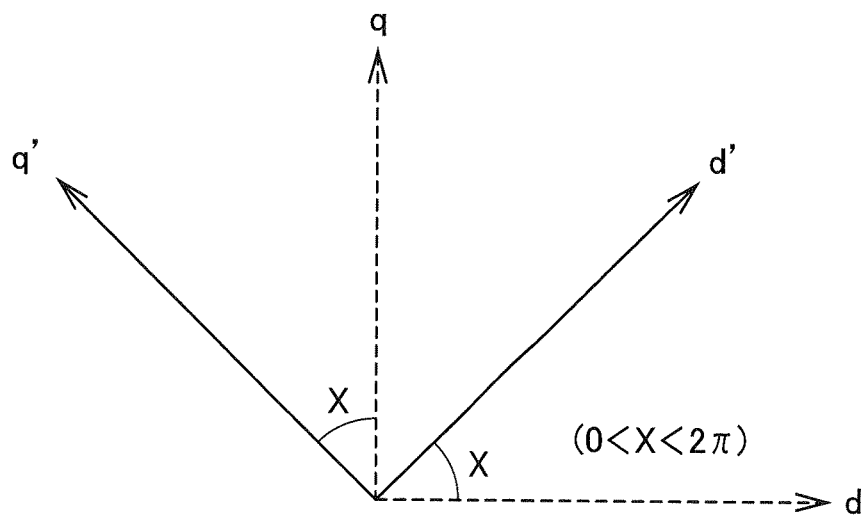
FIG. 8 is a view showing a rotary coordinate system of a fundamental wave of a current to be controlled by the control apparatus as a modification of the exemplary embodiments of the present invention.

FIG. 8 is a view showing a rotary coordinate system of the fundamental wave of a current controlled by the control apparatus as a modification of the exemplary embodiments of the present invention.

The concept of the present invention is not limited by the structure using the dq coordinate system in which the d axis direction is a direction of magnetic flux of the magnetic field. For example, as shown in FIG. 8, it is possible to use a DC coordinate system (as a dq coordinate system shown in FIG. 8) composed of a first axis and a second axis which is perpendicular to the first axis. The first axis is shifted from the direction of the magnetic flux of the magnetic field by x radian ($0 < x < 2\pi$).

(Higher harmonic rotary coordinate component calculation unit)

Like the fundamental rotary coordinate system explained in the first exemplary embodiment and shown in FIG. 8, it is possible to use an orthogonal coordinate system which is shifted from the dqn coordinate system by x radian ($0<x<2\pi$) instead of using the dqn coordinate system.

Figure 9:
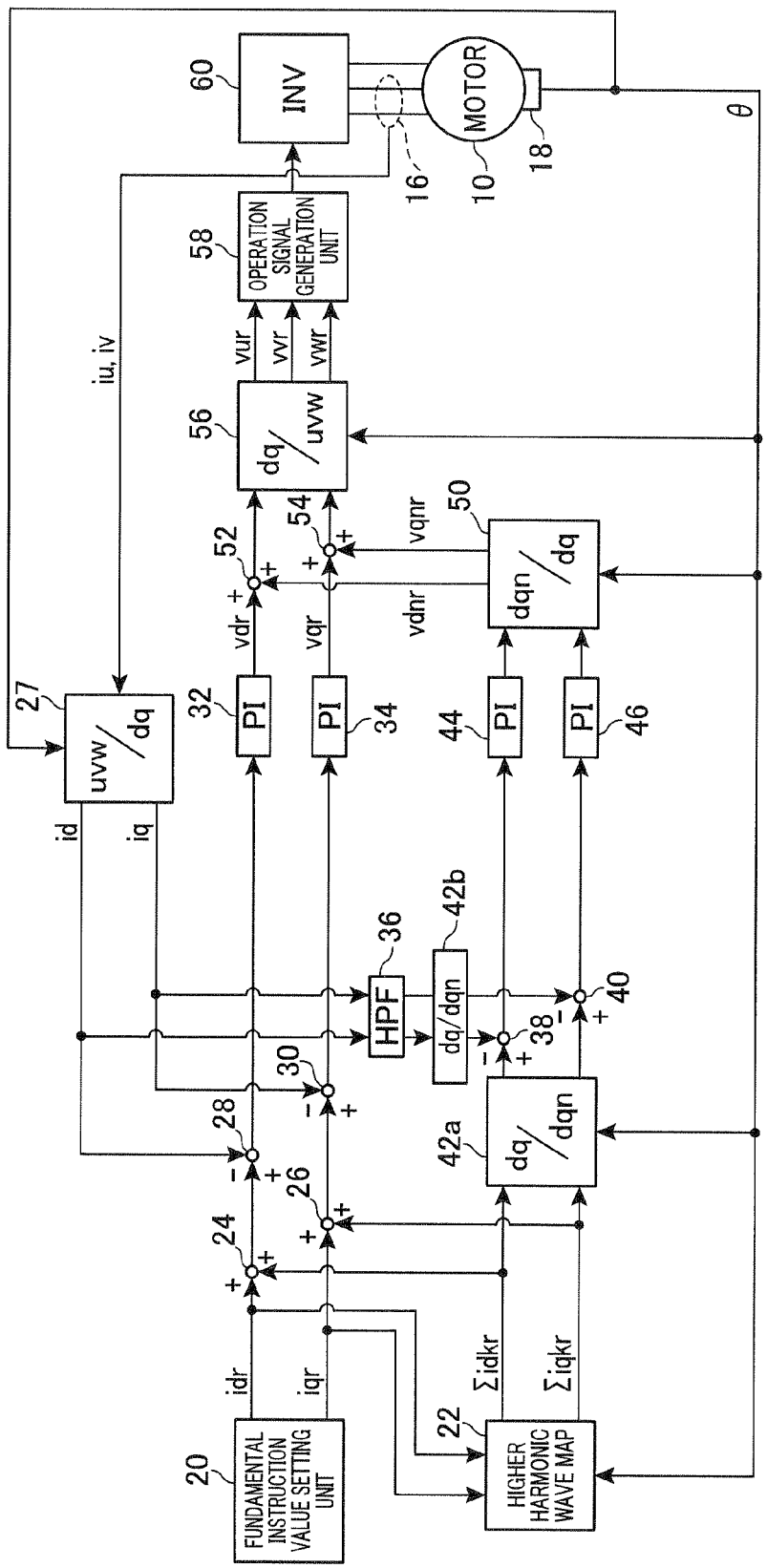
FIG. 9 is a view showing a system configuration of the control apparatus for an electric rotary machine according to a modification of the first exemplary embodiment of the present invention.

FIG. 9 is a view showing a system configuration of the control apparatus for an electric rotary machine according to a modification of the first exemplary embodiment of the present invention.

The concept of the present invention is not limited by the structure of the control apparatus according to the first exemplary embodiment.

For example, as shown in FIG. 9, it is possible for the d axis higher harmonic current deviation calculation unit 38 and the q axis higher harmonic current deviation calculation unit 40 to calculate a difference between the output value of the dq/dqn transformation unit 42a and the output value of the dq/dqn transformation unit 42b. The dq/dqn transformation unit 42a transforms the higher harmonic current instruction values Σidkr and Σiqkr to the output value. The dq/dqn transformation unit 42b transforms the output value of the high-pass filter 36 to the output value.

Further, as shown in FIG. 9, the do axis current feedback control unit 44 and the qn axis current feedback control unit 46 input the difference values output from the d axis higher harmonic current deviation calculation unit 38 and the q axis higher harmonic current deviation calculation unit 40, respectively.

Figure 10:
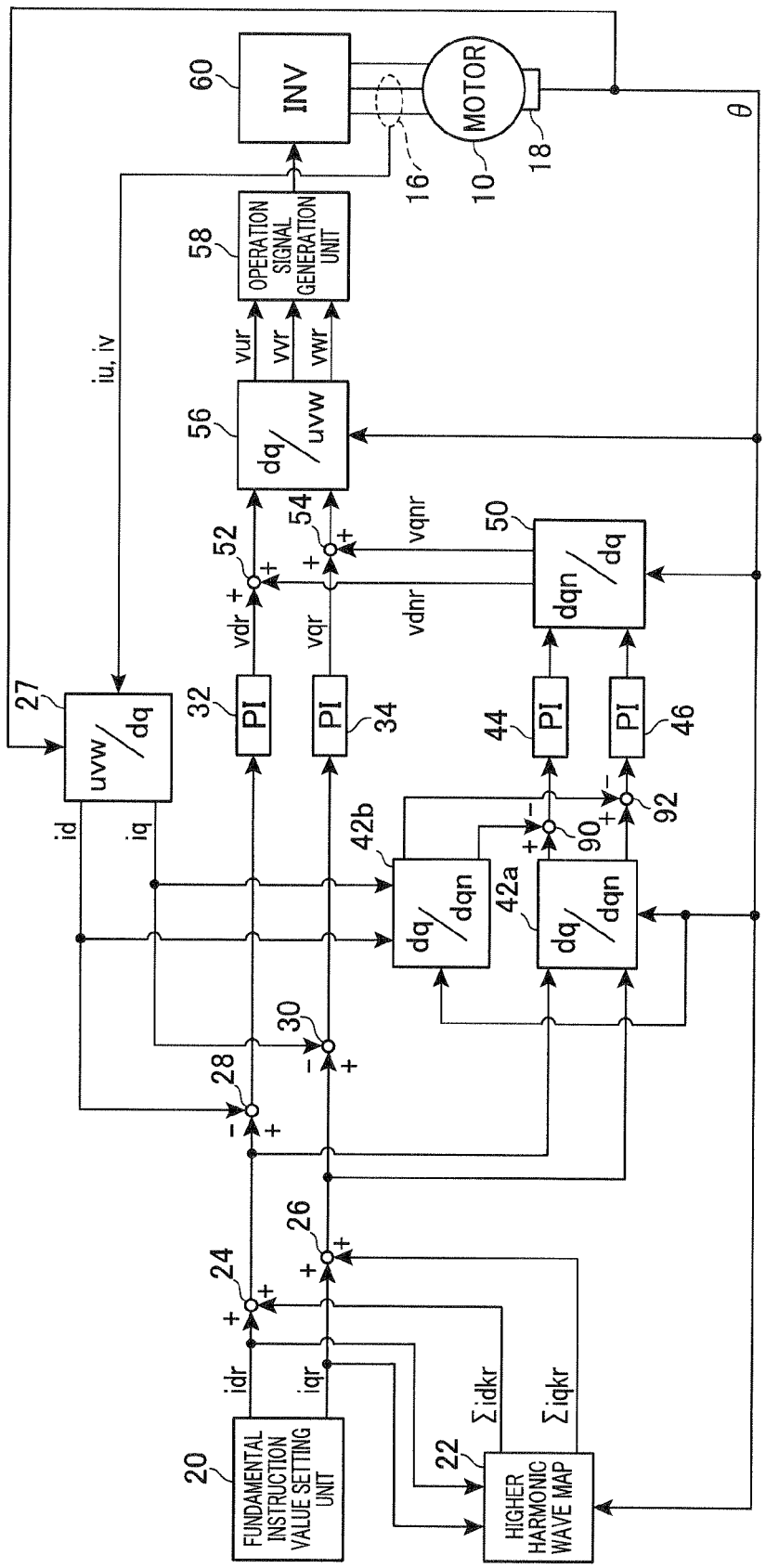
FIG. 10 is a view showing a system configuration of the control apparatus for an electric rotary machine according to a modification of the second exemplary embodiment of the present invention.

FIG. 10 is a view showing a system configuration of the control apparatus for an electric rotary machine according to a modification of the second exemplary embodiment of the present invention.

As shown in FIG. 10, it is possible for the dq/dqn transformation unit 42a to transform the output value of the d-axis current instruction adjusting unit 24 and the output value of the q-axis current instruction adjusting unit 26 into the components in the dqn coordinate system. Further, it is possible for the dq/dqn transformation unit 42b to transform the output values of the uvw/dq transformation unit 27. In this case, a dn axis deviation calculation unit 90 and a qn axis deviation calculation unit 92 calculate a difference between the output values of the dq/dqn transformation unit 42a and the dq/dqn transformation unit 42b. The dn axis current feedback control unit 44 and the qn axis current feedback control unit 46 input the difference values as the calculation results output from the dn axis deviation calculation unit 90 and the qn axis deviation calculation unit 92, respectively.

Figure 11:
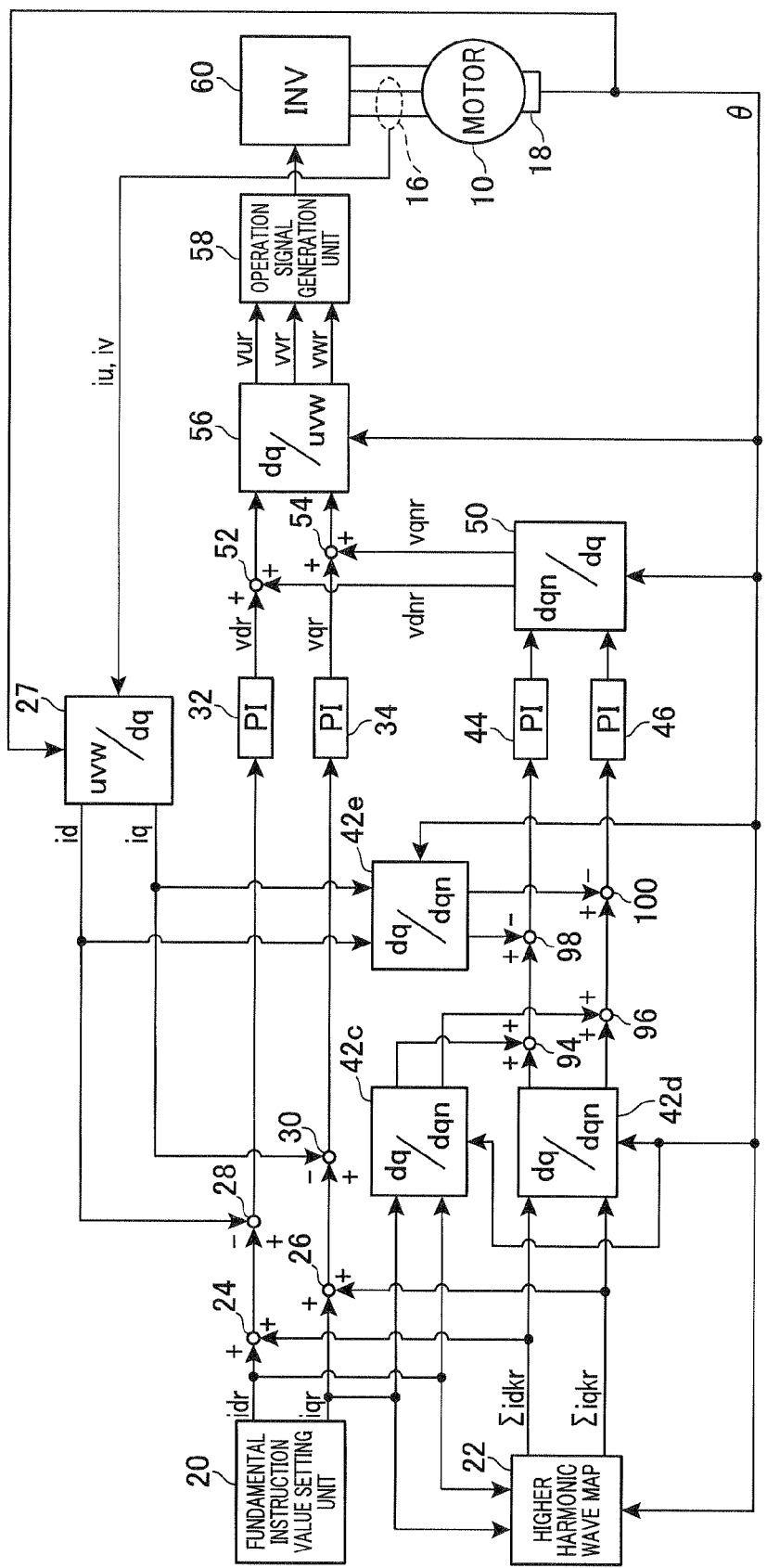
FIG. 11 is a view showing a system configuration of the control apparatus for an electric rotary machine according to another modification of the second exemplary embodiment of the present invention.

FIG. 11 is a view showing a system configuration of the control apparatus for an electric rotary machine according to another modification of the second exemplary embodiment of the present invention.

As shown in FIG. 11, dq/dqn transformation units 42c, 42d and 42e transform the current instruction values idr and iqr, the higher harmonic current instruction values Σidkr and Σiqkr and the actual current values id and iq to components in the dqn coordinate system. In this case, a dn axis instruction value adjusting unit 94 and a qn coordinate instruction value adjusting unit 96 add the dn axis instruction values and the qn axis instruction values, respectively, output from the dq/dqn transformation units 42c and 42d.

Further, a dn axis deviation calculation unit 98 calculates a difference between the output value of the dn axis instruction value adjusting unit 94 and the output value of the dq/dqn transformation unit 42e. A qn coordinate deviation calculation unit 100 calculates a difference between the output value of the qn coordinate instruction value adjusting unit 96 and the output value of the dq/dqn transformation unit 42e. The dn axis current feedback control unit 44 and the qn axis current feedback control unit 46 input the output values as the difference values output from the do axis deviation calculation unit 98 and the qn coordinate deviation calculation unit 100, respectively.

The concept of the present invention is not limited by the structures of the control apparatus shown in FIG. 10 and FIG. 11. For example, it is possible for the control apparatus to use the higher harmonic wave map 22 which outputs the dqn axis components on the basis of a relationship between the dqn axis components and the higher harmonic current instruction values Σidkr and Σiqkr in one-to-one correspondence.

Further, it is possible for the control apparatus to use higher harmonic current components of one order or a different two orders as DC components. Still further, it is possible for the control apparatus to use higher harmonic current components of different three or more orders as DC components.

(Electric Rotary Machine)

The concept of the present invention is not limited by the AC electric motor 10 having eight poles and 48 slots as the control target of the control apparatus.

The first to fourth exemplary embodiments previously described show the AC electric motor 10 having a structure in which the stator windings are connected in a star connection. The concept of the present invention is not limited by the star connection. For example, it is possible for the stator winding of the AC electric motor to have a delta connection. Still further, it is possible for the AC electric motor 10 to have phases of not less than four, for example, to have five phases.

(AC Voltage Supply Unit)

The concept of the present invention is not limited by the structure of the DC-AC transformation circuit 60 (or the inverter INV) as the AC voltage supply device arranged between the control apparatus according to the exemplary embodiment and the AC electric motor 10. For example, the control apparatus according to the exemplary embodiment provides the operation signals to the AC voltage supply device 60. The inverter (INV) As the AC voltage supply device 60 supplies the AC power to the AC electric motor 10 on the basis of the operation signals supplied from the control apparatus. That is, the terminals of the AC electric motor 10 are connected with the positive electrode and the negative electrode of the DC power source through the inverter (INV) 60. It is also possible to use a converter connected with terminals of the AC electric motor 10. Such a converter is disclosed in various patent documents, for example, Japanese patent laid open publication No. 2008-30825, instead of the inverter (INV) 60.

(Other Features and Effects of the Present Invention)

In the control apparatus for an electric rotary machine 10 according to another aspect of the present invention, the higher harmonic instruction values contain higher harmonic currents of an order which becomes a direct current component in the higher harmonic rotary coordinate system and the instruction values of higher harmonic currents having a different order.

Further, in the control apparatus for the electric rotary machine 10 according to another aspect of the present invention, the second control unit is composed of the do axis current feedback control unit 44, the qn axis current feedback control unit 46 and the dqn/dq transformation unit 50, for example. The second control unit 44, 46 and 50 executes the feedback control of the current flowing in the electric rotary machine 10 on the basis of the components in the higher harmonic rotary coordinate system calculated by the higher harmonic rotary coordinate component calculation unit 42. The higher harmonic rotary coordinate component calculation unit 42 calculates the components in the higher harmonic rotary coordinate system by transforming the higher harmonic instruction values, the fundamental instruction values, and the current flowing in the electric rotary machine 10 to the components.

The first control unit 32 and 34 adjusts the components other than the higher harmonic components of the current flowing in the electric rotary machine 10 into the fundamental instruction values. Accordingly, it can be considered that the fundamental wave components are adequately eliminated from a difference between the fundamental instruction values and the current flowing in the electric rotary machine 10. On the basis of this feature, the higher harmonic rotary coordinate component calculation unit 42 uses the fundamental instruction values as input parameters. This makes it possible to eliminate any unit such as a high-pass filter capable of extracting higher harmonic components from the current flowing in the electric rotary machine 10.

In the control apparatus for an electric rotary machine 10 according to another aspect of the present invention, the second control unit 44, 46, 50 executes the feedback control of the current flowing in the electric rotary machine 10 on the basis of the components in the higher harmonic rotary coordinate system calculated by the higher harmonic rotary coordinate component calculation unit 42. The higher harmonic rotary coordinate component calculation unit 42 transforms, to the components in the higher harmonic rotary coordinate system, a difference between the current flowing in the electric rotary machine 10 and the value obtained by adding the higher harmonic instruction values and the fundamental instruction values.

In the control apparatus for an electric rotary machine 10 according to another aspect of the present invention, the second control unit 44, 46, 50 has a higher harmonic component extracting unit 36. The higher harmonic component extracting unit 36 extracts higher harmonic components from the current flowing in the electric rotary machine 10. The second control unit 44, 46, 50 executes the feedback control of the current flowing in the electric rotary machine 10 on the basis of the components in the higher harmonic rotary coordinate system. The higher harmonic rotary coordinate component calculation unit 42 calculates the components in the higher harmonic rotary coordinate system by transforming the higher harmonic instruction values and the higher harmonic components from the current which flows in the electric rotary machine 10 into the components in the higher harmonic rotary coordinate system as the outputs of the higher harmonic component extracting unit 36.

It is therefore possible for the higher harmonic component extracting unit 36 as a high-pass filter to output the current without any fundamental components. The higher harmonic rotary coordinate component calculation unit 42 inputs as input parameters the current components without the fundamental components output from the higher harmonic component extracting unit 36.

In the control apparatus for an electric rotary machine 10 according to another aspect of the present invention, the second control unit 44, 46 and 50 executes the feedback control of the current flowing in the electric rotary machine 10 on the basis of the components in the higher harmonic rotary coordinate system calculated by the higher harmonic rotary coordinate component calculation unit 42. The higher harmonic rotary coordinate component calculation unit 42 transforms a difference between the higher harmonic components extracted by the higher harmonic component extracting unit 36 and the higher harmonic instruction values into the components in the higher harmonic rotary coordinate system.

In the control apparatus for an electric rotary machine 10 according to another aspect of the present invention, the higher harmonic rotary coordinate system has a period which is equal to the number of slots per electric angle period of the electric rotary machine 10.

In general, because the slots and the stator core (teeth) in an electric rotary machine have a different permeance, there is a tendency to increase a torque ripple in the electric rotary machine by the influence of the higher harmonic waves corresponding to the rotation period of the slots and the stator core due to the rotation of a rotor, where a stator winding is stored in the slots and the stator winding is wound around the stator core (teeth). In order to eliminate this problem, the control apparatus according to the exemplary embodiment transforms the components which affect the torque ripple of the electric rotary machine to DC components. The second control unit 44, 46 and 50 use the DC components effectively during the feedback control of the current flowing in the electric rotary machine.

In the control apparatus for an electric rotary machine 10 according to another aspect of the present invention, the second control unit 44, 46 and 50 uses the higher harmonic coordinate system composed of a plurality of rotary coordinate systems having a different period corresponding to higher harmonic waves having a different order, respectively.

Using the DC components transformed from the higher harmonic components of the current flowing in the electric rotary machine 10 as the instruction values of the feedback control makes it possible to execute easy feedback control of the current flowing in the electric rotary machine 10. The control apparatus according to the exemplary embodiment uses a plurality of higher harmonic rotary coordinate systems. This makes it possible to easily control and adjust a plurality of higher harmonic components in the current having a different order.

In the control apparatus for an electric rotary machine 10 according to another aspect of the present invention, the fundamental rotary coordinate system is a dq coordinate system which rotates in synchronization with a frequency of the fundamental current, and the higher harmonic rotary coordinate system is a higher harmonic dq coordinate system which rotates at a speed of a multiple frequency of an order of the higher harmonic current component when compared with the fundamental rotary coordinate system.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A control apparatus for an electric rotary machine comprising:
   a fundamental rotary coordinate component calculation unit which calculates components in a fundamental rotary coordinate system, the fundamental rotary coordinate system rotating in synchronization with a frequency of a fundamental current, and an output torque of an electric rotary machine being determined by the fundamental current in the current flowing in the electric rotary machine;
   a first control unit which executes a feedback control of a current flowing in the electric rotary machine so that the current flowing in the electric rotary machine is adjusted to instruction values, the instruction values being obtained by adding higher harmonic instruction values as instruction values of higher harmonic current having a frequency of an integer multiple of a frequency of the fundamental current and fundamental instruction value of the fundamental current on the basis of the components of the rotary coordinate system of the fundamental wave calculated by the fundamental rotary coordinate component calculation unit, and outputs a first instruction voltage;

a higher harmonic rotary coordinate component calculation unit which calculates components of the higher harmonic rotary coordinate system which rotates in synchronization with the frequency of the higher harmonic current on the basis of a signal as the components of the components in a fundamental rotary coordinate system calculated by the fundamental rotary coordinate component calculation unit;

a second control unit which executes a feedback control for the higher harmonic current by using the components of the higher harmonic coordinate system calculated by the higher harmonic rotary coordinate component calculation unit, and outputs a second instruction voltage;

an addition unit which adds the first instruction voltage calculated by the first control unit and the second instruction voltage calculated by the second control unit;

a dq-uvw transformation unit which performs a dq-uvw inverse transformation to calculate an instruction voltage on the basis of the addition result calculated by the addition unit; and an alternating current voltage supply unit which supplies an alternating current voltage to the electric rotary machine on the basis of the instruction voltage calculated by the dq-uvw transformation unit.

2. The control apparatus for an electric rotary machine according to claim 1, wherein the higher harmonic instruction values contain:

higher harmonic currents of an order which becomes a direct current component in the higher harmonic rotary coordinate system; and the instruction values of higher harmonic currents having a different order from each other.

3. The control apparatus for an electric rotary machine according to claim 1, wherein the second control unit executes the feedback control of the current flowing in the electric rotary machine on the basis of the components in the higher harmonic rotary coordinate system calculated by the higher harmonic rotary coordinate component calculation unit, the higher harmonic rotary coordinate component calculation unit calculates the components in the higher harmonic rotary coordinate system by transforming the higher harmonic instruction values, the fundamental instruction values, and the current flowing in the electric rotary machine to the components in the higher harmonic rotary coordinate system.

4. The control apparatus for an electric rotary machine according to claim 3, wherein the second control unit executes the feedback control of the current flowing in the electric rotary machine on the basis of the components in the higher harmonic rotary coordinate system calculated by the higher harmonic rotary coordinate component calculation unit which transforms, to the components in the higher harmonic rotary coordinate system, a difference between the current flowing in the electric rotary machine and the value obtained by adding the higher harmonic instruction values and the fundamental instruction values.

5. The control apparatus for an electric rotary machine according to claim 1, wherein the second control unit has a higher harmonic component extracting unit which extracts higher harmonic components from the current flowing in the electric rotary machine, and the second control unit executes the feedback control of the current flowing in the electric rotary machine on the basis of the components in the higher harmonic rotary coordinate system, and the higher harmonic rotary coordinate component calculation unit calculates the components in the higher harmonic rotary coordinate system by transforming the higher harmonic instruction values and the higher harmonic components from the current flowing in the electric rotary machine as the outputs of the higher harmonic component extracting unit.

6. The control apparatus for an electric rotary machine according to claim 5, wherein the second control unit executes the feedback control of the current flowing in the electric rotary machine on the basis of the components in the higher harmonic rotary coordinate system calculated by the higher harmonic rotary coordinate component calculation unit, the higher harmonic rotary coordinate component calculation unit transforms a difference between the higher harmonic components extracted by the higher harmonic component extracting unit and the higher harmonic instruction values into the components in the higher harmonic rotary coordinate system.

7. The control apparatus for an electric rotary machine according to claim 1, wherein the higher harmonic rotary coordinate system has a period which is equal to the number of slots per electric angle period of the electric rotary machine.

8. The control apparatus for an electric rotary machine according to claim 1, wherein the second control unit uses the higher harmonic coordinate system composed of a plurality of rotary coordinate systems having a different period corresponding to higher harmonic waves having a different order, respectively.

9. The control apparatus for an electric rotary machine according to claim 1, wherein the fundamental rotary coordinate system is a dq coordinates system which rotates in synchronization with a frequency of the fundamental current, and the higher harmonic rotary coordinate system is a higher harmonic dq coordinate system which rotates at a speed of a multiple frequency of an order of the higher harmonic current component when compared with the fundamental rotary coordinate system.

* * * * *